United States Patent [19]

Minohara et al.

[11] Patent Number: 4,954,176

[45] Date of Patent: Sep. 4, 1990

[54] PIGMENT

[75] Inventors: Taketoshi Minohara, Toyota; Yoshio Takagi, Nagoya; Tadashi Isobe; Keita Suzuki, both of Okazaki, all of Japan

[73] Assignee: Toyota Jidosha Kabushiki Kaisha, Japan

[21] Appl. No.: 252,313

[22] Filed: Oct. 3, 1988

[30] Foreign Application Priority Data

Oct. 21, 1987 [JP] Japan ................................ 62-265795

[51] Int. Cl.[5] .............................................. C04B 14/00

[52] U.S. Cl. .................................... 106/417; 106/404; 106/436; 106/453; 106/456; 106/472; 106/479

[58] Field of Search ............... 106/404, 417, 436, 453, 106/456, 472, 479

[56] References Cited

U.S. PATENT DOCUMENTS

| | | | |
|---|---|---|---|
| 3,634,119 | 1/1972 | Klenke | 106/417 |
| 3,647,492 | 3/1972 | Chapman et al. | 106/417 |
| 4,772,331 | 9/1988 | Noguchi et al. | 106/479 |

FOREIGN PATENT DOCUMENTS

| | | |
|---|---|---|
| 57-161055 | 10/1982 | Japan . |
| 60-60163 | 4/1985 | Japan . |
| 60-81260 | 5/1985 | Japan . |
| 60-118267 | 6/1985 | Japan . |
| 60-33133 | 8/1985 | Japan . |
| 61-225264 | 10/1986 | Japan . |
| 62-95176 | 5/1987 | Japan . |
| 63-43962 | 2/1988 | Japan . |
| 63-43963 | 2/1988 | Japan . |

*Primary Examiner*—Deborah Yee
*Attorney, Agent, or Firm*—Finnegan, Henderson, Farabow, Garrett & Dunner

[57] ABSTRACT

A pigment of this invention comprises a ceramic scaly substrate, and metal dots or alloy dots formed on the surfaces of ceramic scaly substrate in the ratio of from 0.05 to 95% of the total surface area of ceramic scaly substrate. An inorganic compound coating film may further be formed on all over the surfaces of ceramic scaly substrate, and metal dots or alloy dots may be formed on the surfaces of inorganic compound coating film instead of on the surfaces of ceramic scaly substrate in the same ratio. Thus, this pigment gives various hues with metallic gloss feelings due to combined effect of light reflection and light scattering with metal dots or alloy dots and even light interference with two pairs of reflecting surfaces when the inorganic compound coating film is employed.

27 Claims, 4 Drawing Sheets

LIGHT REFLECTED WITH METAL DOTS

LIGHT INTERFERED WITH INORGANIC COMPOUND COATING FILM

LIGHT INTERFERED WITH INORGANIC COMPOUND COATING FILM

3

2

1

PIGMENT

BACKGROUND OF THE INVENTION

1. Field of the Invention

This invention relates to a pigment, and more particularly to a pigment giving a novel appearance. The pigment of this invention is applicable to an automobile metallic coating for offering a novel appearance.

2. Description of the Prior Art

Conventional pigments as shown in FIGS. 8 and 9 have been known, and are set forth in Japanese Unexamined Patent Publication No. 161055/1982. One of the pigments, shown in FIG. 8, has a scaly substrate 100, and a metal coating film 400 formed on all over the scaly substrate 100. The scaly substrate 100 is natural or synthetic mica. The other pigment, shown in FIG. 9, has the scaly substrate 100, an inorganic compound coating film 200 formed on all over the scaly substrate 100, and the metal coating film 400 formed on all over the inorganic compound coating film 200. The inorganic compound coating film 200 is titanium dioxide, and the metal coating film 400 is formed by plating an appropriate metal.

The conventional pigments shown in FIGS. 8 and 9 have smooth surfaces and give a sharp gloss color, however, they simply give a metallic gloss feeling due to the specular reflection, since all of their surfaces are coated with the metal coating film 400.

SUMMARY OF THE INVENTION

This invention has been developed to improve the appearance offered by the conventional pigments.

It is therefore an object of this invention to provide a pigment giving a metallic gloss feeling as well as a colorful feeling for a novel appearance.

It is an important and another object of this invention to provide a pigment, which gives a metallic gloss feeling as well as a colorful feeling by causing light reflection and light scattering with a metal and light interference with an inorganic compound film, for offering a novel appearance.

A pigment of this invention comprises a ceramic scaly substrate, and the metal dots or alloy dots formed on the surfaces of ceramic scaly substrate in the ratio of from 0.05 to 95% of the total surface area of ceramic scaly substrate.

As for the ceramic scaly substrate, mica or molybdenum disulfide may be employed. The mica may be natural mica, such as muscovite, biotite and phlogopite, or synthetic mica.

Generally speaking, the ceramic scaly substrate is a thin plate. It has the ratio of thickness to side length which falls approximately in the range of from 1/100 to 1/20. Its average thickness is from $5\times10^{-2}$ to $10\times10^{-2}$ $\mu$m, and its average side length is from 3 to 50 $\mu$m for most cases.

The metal dots or alloy dots are formed on the surfaces of ceramic scaly substrate in a scattered manner. The number of metal dots or alloy dots, the distribution, and the size or height may be determined at one's discretion. The metal dots or alloy dots are usually formed by electroless plating.

The metal dots or alloy dots 3 may be formed on the surfaces of a transparent inorganic compound coating film 2, which is formed on all over the ceramic scaly substrate 1, as illustrated in FIG. 1, or they may be formed directly on the surfaces of ceramic scaly substrate 1 as illustrated in FIG. 3. The former way is equivalent to forming the metal dots or alloy dots 3 on titanized mica having titanium dioxide film coated on the surfaces of mica which gives a pearly gloss feeling with the light interference. Thus, it is useful for offering a novel appearance since not only the light reflection and light scattering are caused with metal dots or alloy dots but also the light interference is caused with the inorganic compound coating film 2.

As for the metal dots or alloy dots, the following may be employed: silver, gold, copper, palladium, cobalt, nickel-phosphorus alloy, nickel-boron alloy, nickel-cobalt-phosphorus alloy, nickel-tungsten-phosphorus alloy, silver-gold alloy, and cobalt-phosphorus alloy.

The metal dots or alloy dots are formed either on the surfaces of the ceramic scaly substrate or the surfaces of the inorganic compound coating film in the predetermined ratio of the total surface area of either the ceramic scaly substrate or the inorganic compound coating film. If the metal dots or alloy dots occupy less than 0.05% of the total surface area, there is no appreciable difference between the feeling given by the pigment of this invention and the feeling given by the conventional pigment which has no metal coating film. If the metal dots or alloy dots occupy more than 95% of the total surface, there is no appreciable difference between the feeling given by the pigment of this invention and the feeling given by the conventional pigment which has a metal coating film formed all over on its surfaces.

As for the inorganic compound coating film, the following may be employed: titanium dioxide, iron oxide, aluminum hydroxide, chromium hydroxidea and like transparent inorganic compounds. The inorganic compound coating film is formed as follows: The ceramic scaly substrate is immersed into an aqueous solution of an inorganic salt containing a desired metal to deposit the inorganic salt on the surfaces of the ceramic scaly substrate. The inorganic salt deposited is hydrolyzed and calcined at a predetermined temperature to form a stabilized inorganic compound coating film. A specific inorganic compound and the film thickness are determined in accordance with desired coloring.

Thus, the pigment according to this invention may have two pairs of reflecting surfaces, the rays reflected with the two pairs of reflecting surfaces interfere with each other due to the phase difference. The reflectance for an incident ray with a given wavelength is determined by Fresnel equations. And the interference color is determined by optical thickness of film, i.e. (Geometrical Film Thickness)$\times$(Index of Refraction). Accordingly, a desired pearly gloss feeling can be achieved by determining the optical thickness of inorganic compound coating film, i.e. the determination of inorganic compound and film thickness. Further, the coloring, such as yellow, red, blue and so on resulting from the interference, depends on the thickness of inorganic compound coating film.

The inorganic compound coating film may be further be coated with a transparent coloring film 4, as illustrated in FIG. 7, comprising the following coloring agent: chromium oxide, iron oxide, iron blue pigment carbon black, or the like. When it is covered with the coloring film comprising a coloring agent whose color is similar to the interference color of the inorganic compound coating film, the color resulting from the interference will be enhanced. When it is covered with the coloring film comprising a coloring agent whose color is different from the interference color of the inorganic compound coating film, a still another coloring will be obtained.

As described above, the pigment of this invention comprises a ceramic scaly substrate, and the metal dots or alloy dots formed on the surfaces of ceramic scaly substrate in the ratio of from 0.05 to 95% of the total surface area of ceramic scaly substrate. Since the pigment of this invention has the metal dots or alloy dots which are different from the conventional simple laminated arrangement, some of a ray coming into the pigment are reflected and scattered with the surface of metal dots or alloy dots, some of the ray are reflected with the surface of ceramic scaly substrate, and some of the ray transmit through the ceramic scaly substrate. As a result, the pigment of this invention offers a novel appearance by causing the light reflection and scattering. It is distinct from the simple metallic gloss feeling. To be specific, the pigment of this invention usually offers a clear color having brightness in a lesser degree. For example, when gold dots are formed, colors from pink to purple are offered by the pigment depending on the gold dot particle diameter, the gold dot distribution and the gold dot deposition rate on the surface of ceramic scaly substrate.

When the pigment of this invention comprises the ceramic scaly substrate, an inorganic compound coating film formed on all over the ceramic scaly substrate, and the metal dots or alloy dots formed on the surfaces of inorganic compound coating film in the ratio of from 0.05 to 95% of the total surface area of inorganic compound coating film, the incident ray reflected with the surfaces of metal dots or alloy dots, as shown in FIG. 6, gives a metallic gloss feeling. On the other hand, some of the incident ray coming into portions free from the metal dots or alloy dots are reflected with the surface of inorganic compound coating film, and some of the incident ray are reflected with the surface of ceramic scaly substrate and they interfere with each other. Thus, this pigment gives various hues resulting from the light scattering with the metal dots or alloy dots and the light interference with the two pairs of reflecting surfaces as well as a metallic gloss feeling resulting from the light reflection with the metal dots or alloy dots.

The two pigments of this invention described above offer novel appearances which have never been achieved by the conventional pigments. When coating automobiles and the like with the pigments of this invention, metallic coating with novel appearances can be offered. Especially when using the latter pigment, the automobiles can be coated in an appealing appearance.

In this invention, it is possible to produce a pigment giving various novel hues as desired by appropriately determining the following: a metal or an alloy for the metal dots or alloy dots, an amount of reducing agent to be used, an amount of metal or alloy to be deposited, an inorganic compound for the inorganic compound coating film and thickness of inorganic compound coating film when it is employed, and a coloring agent for the coloring film and thickness of coloring film when it is employed.

In addition, the cost for producing the pigment of this invention has been reduced sharply, since the amount of metal or alloy used has been decreased remarkably in the pigment of this invention compared with the conventional pigment, in which all of its surfaces are coated with the metal or alloy film. This advantage is especially effective when noble metals must be used.

BRIEF DESCRIPTION OF THE DRAWINGS

The above and other objects, features and advantages of this invention will become fully apparent from the following description taken in conjunction with the accompanying drawings, in which.

DETAILED DESCRIPTION OF THE PREFERRED EMBODIMENTS

Preferred embodiments of this invention will be hereinafter described with reference to the accompanying drawings.

FIRST PREFERRED EMBODIMENTS

Figure 1:
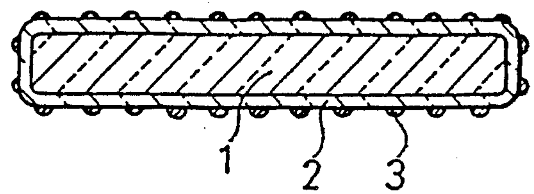
FIG. 1 is a schematic sectional view of a pigment according to a first preferred embodiment of this invention.
Figure 2:
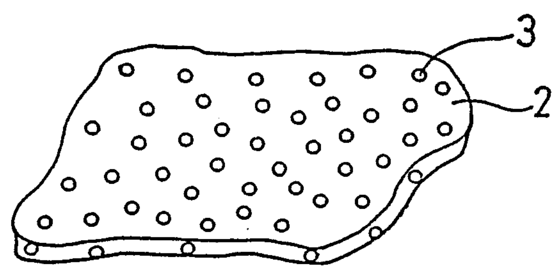
FIG. 2 is a schematic perspective view of the pigment illustrated in FIG. 1.
Figure 3:
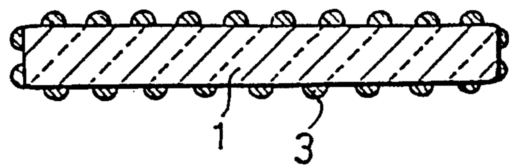
FIG. 3 is a schematic sectional view of a pigment according to this invention.

First preferred embodiments according to this invention comprise a ceramic scaly substrate 1, an inorganic compound coating film 2 and metal dots 3 as illustrated in FIG. 1. Mica is employed for the ceramic scaly substrate 1, titanium dioxide is employed for the inorganic compound coating film 2, and silver is employed for the metal dots 3.

Pearl pigment "A" listed in a following table is "Exterior Mearlin Fine-Pearl" produced by the Mearl Corp., and gives an appearance of white gloss feeling as listed in the line of specimen No. 12. Pearl pigment "B" listed in the table is "Iriodin 9103" produced by Merck Japan Co., Ltd., and gives an appearance of white gloss feeling as listed in the line of specimen No. 20. Pearl pigment "C" listed in the table is "Iriodin 9225" produced by Merck Japan Co., Ltd., and gives an appearance of blue gloss feeling as listed in the line of specimen No. 21. Pearl pigment "D" listed in the table is "Iriodin 9504" produced by Merck Japan Co., Ltd., and gives an appearance of red gloss feeling as listed in the line of specimen No. 26. These pearl pigments "A" through "D" are titanized mica having a titanium dioxide film 2 coated on the surfaces of mica 1.

In these first preferred embodiments, the pigments according to this invention were produced by depositing the silver dots 3 on the pearl pigments. The silver dots 3 were deposited by the following method while modifying the conditions listed in the table, i.e. an amount of silver solution used, an amount of formalin used and heating temperature and time.

Thirty (30) grams of a pearl pigment was immersed into 900 ml of water, and the mixture was stirred. Silver solution prepared beforehand was added to the stirred mixture by 1 to 200 ml, and then formalin, i.e. an aqueous solution of formaldehyde containing 35% formaldehyde by weight, was added by 3 to 100 ml. The silver solution consisted of 50 g/lit of silver nitrate and 50 ml/lit of 28% aqueous ammonia solution. The mixture was then stirred for 60 minutes. After that, the mixture was filtered to obtain a pigment on which silver dots were deposited. The pigment was repeatedly washed and filtered with excess water 3 times. Then, the pigment thus obtained were dried and calcined at 40° to 500° C. to obtain the pigment according to this invention.

Figure 4:
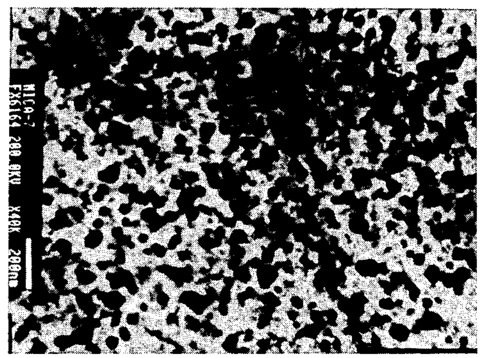
FIG. 4 is a microphotograph of metal dots distribution on a pigment of the first preferred embodiments taken with a transmission type electron microscope.
Figure 5:
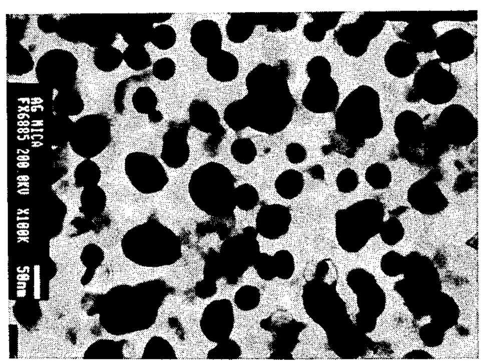
FIG. 5 is a microphotograph of metal dots distribution on an inorganic compound coating film of the pigment shown in FIG. 4 taken with a transmission type electron microscope.
Figure 6:
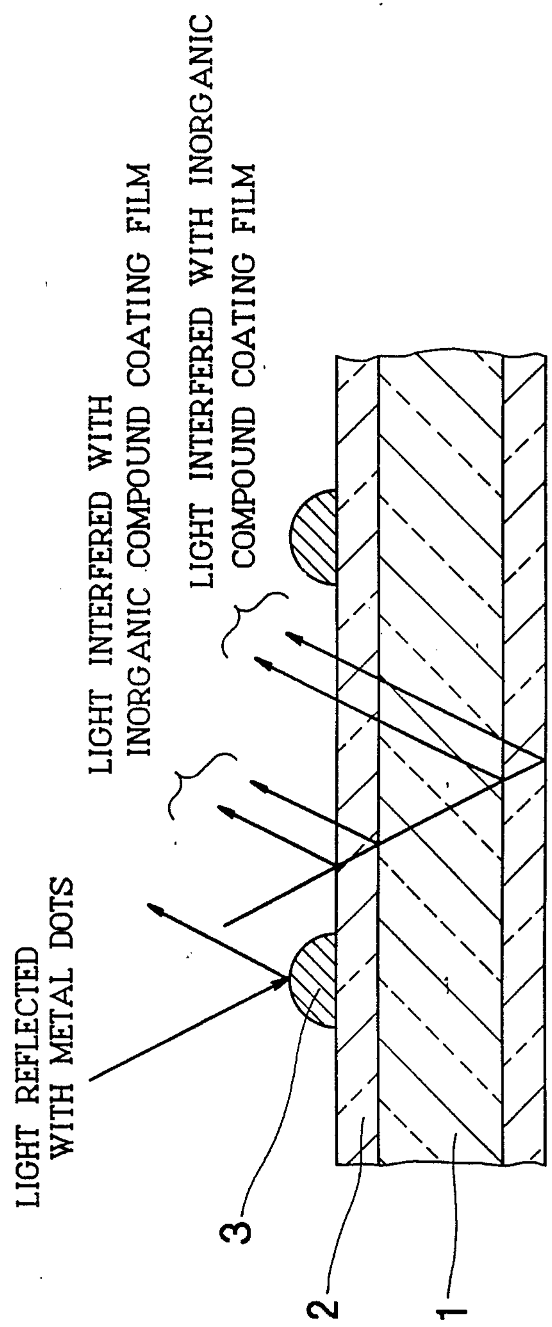
FIG. 6 is a schematic sectional view of a pigment of this invention for explaining optical paths of incident light.
Figure 7:
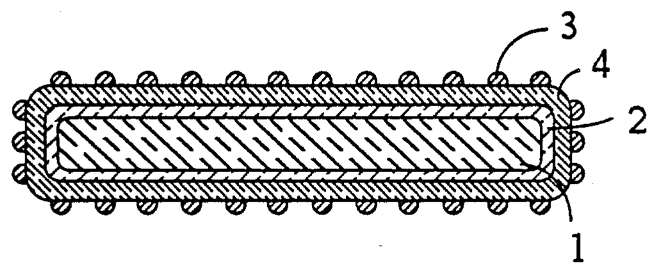
FIG. 7 is a schematic sectional view of another pigment according to this invention.
Figure 8:
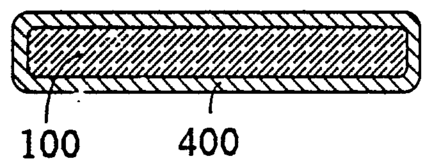
FIG. 8 is a schematic sectional view of a conventional pigment having two-layered film arrangement.
Figure 9:
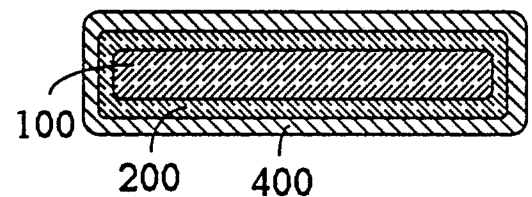
FIG. 9 is a schematic sectional view of another conventional pigment having three-layered film arrangement.

Silver deposition rates, i.e. {(Silver Deposited Area)/(Total Substrate Surface Area)}×100, of pigments produced under various conditions are given in the table. As can be seen from the table, pigments having the silver deposition rate of 0.02 to 95% were produced under the conditions A microphotograph (magnification×40000) of pigment produced as specimen No. 7 taken with a transmission type electron microscope is shown in FIG. 4. In the microphotograph, the white portions are the scaly mica substrate 1 with the titanium dioxide inorganic compound coating film 2, and the black portions are the silver dots 3. Note that the silver dots 3 are the ones formed on the head and tail surfaces of scaly mica substrate 1, since a superimposed image of the head and tail surfaces of scaly mica substrate 1 were taken with the transmission type electron microscope. The titanium dioxide inorganic compound coating film 2 was then peeled off the scaly mica substrate 1, and a microphotograph of the peeled titanium dioxide inorganic compound coating film 2 was taken with the transmission type electron microscope. The microphotograph (magnification×100000) is shown in FIG. 5. In this microphotograph, the white portions are the titanium dioxide inorganic compound coating film 2, and the black portions are the silver dots 3. As can be clearly seen from the microphotographs, the silver dots 3 were formed on the surface of titanium dioxide inorganic compound coating film 2 in a substantially uniform manner.

Pigments produced by the method described above are listed in the table. The appearances of pigments depend on the silver deposition rates, i.e. the amount of silver solution used, the amount of formalin used and heating temperature and time. Specimen Nos. 1 through 10, 14 through 18, 22 and 24 according to this invention gave not only the simple metallic gloss feelings but also metallic gloss feelings accompanying various colorful feelings, such as blue, red, gold and so on. Thus, the pigments of this invention were produced, and offered novel appearances having not only the simple metallic gloss feeling but also various colorful feelings. The pigments of this invention are marked with "Good" in the evaluation column of the table.

When the silver deposition rate was 100% (conventional pigment), i.e. specimen Nos. 13 and 23, the pigments gave only the metallic gloss feeling but no various colorful feelings. On the other hand, when the silver deposition rate was 0% (conventional pigment), i.e. specimen nos. 12, 20, 21 and 26, the pigments offered only the pearly feeling but no metallic gloss feeling. In addition, when the silver deposition rate is less than the lower limit of this invention, i.e. specimen No. 11 with 0.02% silver deposition rate, specimen No. 19 with 0.02% silver deposition rate and specimen No. 25 with 0.03% silver deposition rate, the pigments gave no more feeling than the conventional pigment did. These pigments are marked with "Poor" in the evaluation column of the table.

SECOND PREFERRED EMBODIMENT

Thirty (30) grams of pearl pigment "B" was immersed into a mixed aqueous solution of 20 g/lit of tin dioxide and 40 ml/lit of hydrochloric acid aqueous solution, and the mixture was stirred. After filtering the mixture, the filtered particulates were immersed into a mixed aqueous solution consisting of 0.1 g/lit of palladium chloride and 10 to 20 ml/lit of hydrochloric aqueous solution, and the mixture was stirred and filtered. Thus, a pearl pigment was obtained, and it treated to prepare the surface.

And then, metal dots were deposited on parts of the surface of pearl pigment by following method: The pearl pigment which was treated to prepare the surface was immersed and stirred in a gold plating solution consisting of 2 g/lit of potassium gold cyanide, 75 g/lit of ammonium chloride and 50 g/lit of sodium citrate. While stirring the mixture, 100 g/lit of sodium hypophosphite solution was added to the mixture at the rate of 1 ml/min. for 10 minutes to deposit gold dots on the surfaces of pearl pigment having the undercoat film. After filtering and washing the particulate pigment with excess water, the particulate pigment was dried at 50° C. for 3 hours to obtain the pigment of second preferred embodiment.

The pigment of second preferred embodiment had the gold dots occupying 1.0% of the total surface area of the original pearl pigment. This pigment offered a novel appearance, i.e. a slightly reddish to purplish metallic gloss feeling.

THIRD PREFERRED EMBODIMENT

This preferred embodiment employed alloy dots consisting of nickel-phosphorus alloy produced by eutectic crystallization.

Each of pearl pigments "C" and "D" was treated to prepare the surface by the same method described in the second preferred embodiment. Then, the pearl pigment which was treated to prepare the surface was immersed and stirred in a nickel plating solution consisting of 30 g/lit of nickel chloride and 10 g/lit of sodium citrate. While stirring the mixture, 100 g/lit of sodium hypophosphite solution was added to the mixture at the rate of 1 ml/ min. for 1 hour to deposit nickel-phosphorus alloy dots on the surface of pearl pigment which was treated to prepare the surface. Then, the particulate pigments were filtered, washed and dried by the same method as described in the second preferred embodiment to obtain the pigments of the third preferred embodiment.

The pigments of the third preferred embodiment had the nickel-phosphorus alloy dots occupying 50% of the total surface area of original pearl pigments. The pigment of the third preferred embodiment employing pearl pigment "C" gave a metallic gloss feeling accompanying more intensified blue feeling than the blue feeling given by the plain pigment "C". And the pigment of the third preferred embodiment employing pearl pigment "D" gave a metallic gloss feeling accompanying more intensified red feeling than the red feeling given by the plain pigment "D". Thus, these pigments of the third preferred embodiments offered novel appearances.

surface area of said transparent inorganic compound coating film.

TABLE

| No. | Pearl Pigment | Amount of Silver Solution (ml) | Amount of Formalin (ml) | Heating Temp. & Time (°C. × hr) | Silver Deposition Rate (%) | Appearance | Evaluation |
|---|---|---|---|---|---|---|---|
| 1 | A | 30 | 6 | 50 × 5 | 1 | Bluish metallic gloss feeling | Good |
| 2 | A | 30 | 3 | 50 × 5 | 1 | Slightly bluish metallic gloss feeling | Good |
| 3 | A | 30 | 12 | 50 × 5 | 1 | Reddish metallic gloss feeling | Good |
| 4 | A | 30 | 24 | 50 × 5 | 1 | Reddish metallic gloss feeling | Good |
| 5 | A | 30 | 50 | 50 × 5 | 1 | Gold metallic gloss feeling | Good |
| 6 | A | 30 | 50 | 200 × 5 | 1 | Bluish metallic gloss feeling | Good |
| 7 | A | 60 | 6 | 50 × 5 | 1.5 | Bluish metallic gloss feeling | Good |
| 8 | A | 60 | 3 | 50 × 5 | 1.5 | Bluish metallic gloss feeling | Good |
| 9 | A | 60 | 12 | 50 × 5 | 1.5 | Reddish metallic gloss feeling | Good |
| 10 | A | 1.0 | 6 | 50 × 5 | 0.05 | White metallic gloss feeling | Good |
| 11 | A | 0.5 | 6 | 50 × 5 | 0.02 | Pearly white feeling | Poor |
| 12 | A | — | — | — | 0 | Pearly white feeling | Poor |
| 13 | B | 2000 | 100 | 50 × 5 | 100 | Metallic gloss feeling only | Poor |
| 14 | B | 1000 | 50 | 50 × 5 | 95 | Yellow metallic gloss feeling | Good |
| 15 | B | 500 | 50 | 50 × 5 | 53 | Gold metallic gloss feeling | Good |
| 16 | B | 60 | 10 | 50 × 5 | 2 | Bluish metallic gloss feeling | Good |
| 17 | B | 60 | 6 | 50 × 5 | 2 | Reddish metallic gloss feeling | Good |
| 18 | B | 60 | 6 | 400 × 0.5 | 2 | Bluish metallic gloss feeling | Good |
| 19 | B | 0.8 | 6 | 50 × 5 | 0.02 | Pearly white feeling | Poor |
| 20 | B | — | — | — | 0 | Pearly white feeling | Poor |
| 21 | C | — | — | — | 0 | Pearly blue feeling | Poor |
| 22 | C | 30 | 6 | 50 × 5 | 1 | Intensified Blue metallic gloss feeling | Good |
| 23 | D | 2000 | 100 | 50 × 5 | 100 | Metallic gloss feeling only | Poor |
| 24 | D | 30 | 6 | 50 × 5 | 1 | Intensified red metallic gloss feeling | Good |
| 25 | D | 0.5 | 3 | 50 × 5 | 0.03 | Pearly red feeling | Poor |
| 26 | D | — | — | — | 0 | Pearly red reeling | Poor |

What is claimed is:

1. A pigment comprising:

a ceramic scaly substrate; and metal dots or metal alloy dots formed on the surfaces of said ceramic scaly substrate in a ratio of 0.05 to 95% of the total surface area of said ceramic scaly substrate.

2. A pigment according to claim 1, wherein said metal dots or metal alloy dots are selected from the group consisting of silver (Ag), gold (Au), copper (Cu), palladium (Pd), cobalt(Co), nickel-phosphorus (Ni—P) alloy, nickel-boron (Ni—B) alloy, nickel-cobalt-phosphorus (Ni—Co—P) alloy, nickel-tungsten-phosphorus (Ni—W—P) alloy, silver-gold (Ag—Au) alloy, and cobalt-phosphorus (Co—P) alloy.

3. A pigment according to claim 1, wherein said ceramic scaly substrate comprises one of mica and molybdenum disulfide ($MoS_2$).

4. A pigment according to claim 3, wherein said mica is a thin plate having the ratio of thickness to side length which falls approximately in the range of from 1/100 to 1/20.

5. A pigment according to claim 3, wherein said mica is a thin plate having an average thickness of from $5\times10^{-2}$ to $10\times10^{-2}$ $\mu$m, and the average side length of from 3 to 50 $\mu$m.

6. A pigment according to claim 3, wherein said mica is one of natural mica and synthetic mica.

7. A pigment according to claim 6, wherein said natural mica is one of moscovite, biotite and phlogopite.

8. A pigment comprising:

a ceramic scaly substrate;

a transparent inorganic compound coating film formed on all over the surfaces of said ceramic scaly substrate; and metal dots or metal alloy dots formed on the surfaces of said transparent inorganic compound coating film in a ratio of from 0.05 to 95% of the total surface area of said transparent inorganic compound coating film.

9. A pigment according to claim 8, wherein said metal dots or metal alloy dots are selected from the group consisting of silver (Ag), gold (Au), copper (Cu), palladium (Pd), cobalt (Co), nickel-phosphorus (Ni—P) alloy, nickel-boron (Ni—B) alloy, nickel-cobalt-phosphorus (Ni—Co—P) alloy, nickel-tungsten-phosphorus (Ni—W—P) alloy, silver-gold (Ag—Au) alloy, and cobalt-phosphorus (Co—P) alloy.

10. A pigment according to claim 8, wherein said ceramic scaly substrate comprises one of mica and molybdenum disulfide ($MoS_2$).

11. A pigment according to claim 10, wherein said mica is a thin plate having a ratio of thickness to side length which falls approximately in a range of from 1/100 to 1/20.

12. A pigment according to claim 10, wherein said mica is a thin plate having an average thickness of from $5\times10^{-2}$ to $10\times10^{-2}$ $\mu$m, and an average side length of from 3 to 50 $\mu$m.

13. A pigment according to claim 10, wherein said mica is one of natural mica and synthetic mica.

14. A pigment according to claim 13, wherein said natural mica is one of muscovite, biotite and phlogopite.

15. A pigment according to claim 8, wherein said transparent inorganic compound coating film comprises at least one of titanium dioxide ($TiO_2$), iron oxide ($Fe_2O_3$), aluminum hydroxide ($Al(OH)_3$), and chromium hydroxide ($Cr(OH)_3$).

16. A pigment according to claim 8, wherein said transparent inorganic compound coating film has an average thickness of from $1\times10^{-2}$ to 1 $\mu$m.

17. A pigment comprising:

a ceramic scaly substrate;

a transparent inorganic compound coating film formed on all over the surfaces of said ceramic scaly substrate;

a transparent coloring film formed on all over the surfaces of said inorganic compound coating film; and metal dots or metal alloy dots formed on the surfaces of said coloring film in a ratio of from 0.05 to 95% of the total surface area of said coloring film.

18. A pigment according to claim 17, wherein said metal dots or metal alloy dots are selected from the group consisting of silver (Ag), gold (Au), copper (Cu), palladium (Pd), cobalt (Co), nickel-phosphorus (Ni—P) alloy, nickel-boron (Ni—B) alloy, nickel-cobalt-phosphorus (Ni—Co—P) alloy, nickel-tungsten-phosphorus (Ni—W—P) alloy, silver-gold (Ag—Au) alloy, and cobalt-phosphorus (Co—P) alloy.

19. A pigment according to claim 17, wherein said ceramic scaly substrate comprises one of mica molybdenum disulfide ($MoS_2$).

20. A pigment according to claim 19, wherein said mica is a thin plate having a ratio of thickness to side length which falls approximately in a range of from 1/100 to 1/20.

21. A pigment according to claim 19, wherein said mica is a thin plate having an average thickness of from $5\times10^{-2}$ to $10\times10^{-2}$ $\mu$m, and an average side length of from 3 to 50 $\mu$m.

22. A pigment according to claim 19, wherein said mica is one of natural mica and synthetic mica.

23. A pigment according to claim 22, wherein said natural mica is one of muscovite, biotite and phlogopite.

24. A pigment according to claim 17, wherein said transparent inorganic compound coating film comprises at least one of titanium dioxide ($TiO_2$), iron oxide ($Fe_2O_3$), aluminum hydroxide ($Al(OH)_3$), and chromium hydroxide ($Cr(OH)_3$).

25. A pigment according to claim 17, wherein said transparent inorganic compound coating film has an average thickness of from $1\times10^{-2}$ to 1 $\mu$m.

26. A pigment according to claim 17, wherein said transparent coloring film comprises one of chromium oxide ($Cr_2O_3$), iron oxide ($Fe_2O_3$), iron blue pigment and carbon black.

27. A pigment according to claim 17, wherein said transparent coloring film has an average thickness of from $1\times10^{-3}$ to 1 $\mu$m.

* * * * *